United States Patent [19]

Kähkipuro et al.

[11] Patent Number: 4,737,900
[45] Date of Patent: Apr. 12, 1988

[54] METHOD OF AND APPARATUS FOR CONTROLLING THE BRAKING RESISTOR OF A FREQUENCY CONVERTER

[75] Inventors: Matti Kähkipuro; Harri Hakala, both of Hyvinkää ; Pekka Nummi, Nurmijärvi; Urpo Sten, Hyvinkää all of Finland

[73] Assignee: Kone Elevator GmbH, Baar, Switzerland

[21] Appl. No.: 52,233

[22] Filed: May 20, 1987

[30] Foreign Application Priority Data

May 21, 1986 [FI] Finland ................................ 862151

[51] Int. Cl.4 ................................................ H02J 3/36
[52] U.S. Cl. ......................................... 363/35; 363/37; 318/380
[58] Field of Search ..................... 363/35, 37, 51, 160, 363/161, 163; 318/375, 376, 379, 380, 381

[56] References Cited

U.S. PATENT DOCUMENTS

| | | | |
|---|---|---|---|
| 4,284,936 | 8/1981 | Bailey et al. | 318/381 |
| 4,338,525 | 7/1982 | Kilgore | 318/723 X |
| 4,482,031 | 11/1984 | Yoshida et al. | 363/35 X |
| 4,651,266 | 3/1987 | Fujioka et al. | 363/35 X |

Primary Examiner—Peter S. Wong
Attorney, Agent, or Firm—Sughrue, Mion, Zinn, Macpeak and Seas

[57] ABSTRACT

A method of and apparatus for controlling a braking resistor, provided in a d.c. circuit of a frequency converter, by rectifying a mains voltage, by means of a first rectifier bridge connected to a three-phase mains supply, to form an actual value voltage; comparing said actual value voltage and a reference voltage; and operating a switch in series with the braking resistor to cause the latter to conduct when the comparison indicates that the actual value voltage is greater than the reference voltage. The reference voltage is formed from a rectified voltage obtained from the three-phase mains supply and rectified by a second rectifier bridge.

11 Claims, 2 Drawing Sheets

METHOD OF AND APPARATUS FOR CONTROLLING THE BRAKING RESISTOR OF A FREQUENCY CONVERTER

FIELD OF THE INVENTION

The present invention relates to a method of and apparatus for controlling the braking resistor of a frequency converter, the braking resistor being provided in the d.c. circuit of the frequency converter and being controlled by a switch connected in series with the braking resistor so as to conduct current when an actual value voltage derived from a voltage rectified by a rectifier bridge from a three-phase mains supply voltage is higher than a reference voltage.

DESCRIPTION OF THE PRIOR ART

In numerous applications, a load supplied by a frequency converter is a four-quadrant device, for instance an elevator motor. This means that in both directions of rotation there occur positive as well as negative torques. In that case, power will also flow in both directions.

It is frequent practice to use, for handling the feedback power, a braking resistor provided in the d.c. circuit of the frequency converter and a switch controlling the braking resistor. This switch may, for instance, be a transistor. This way of handling the energy fed back from the load is appropriate e.g. in the case of an elevator with gear transmission. In particular when a worm gear transmission is concerned, which has low efficiency, the quantity of the feedback power is small. It is therefore possible to employ fairly low power resistors to convert the feedback energy into heat.

Resistance braking affords still another advantage in elevator operation. If the elevator must run with the aid of an emergency power installation in which handling of feedback energy is difficult, resistance braking will be an advantageous alternative.

Certain difficulties are encountered in the circuit technology associated with resistance braking. Especially if the braking circuit measures the absolute d.c. voltage level in an intermediate voltage circuit of the frequency converter, difficulties arise when the voltage of the supply mains varies, as the braking resistor is connected to conduct when the voltage exceeds a preset limit. Particularly in excess voltage situations, the braking circuit endeavors to govern the mains voltage increase. In such cases the braking resistor conducts continuously. However, it is not profitable to dimension the braking resistor so that it would conduct continuously because it would then be unreasonably large.

BRIEF SUMMARY OF THE INVENTION

It is accordingly an object of the present invention to eliminate the above-discussed disadvantages of the prior art.

According to the present invention a method of controlling the braking resistor of a frequency converter, the braking resistor being provided in a d.c. circuit of the frequency converter and being controlled by a switch connected in series with the braking resistor, includes rectifying a mains voltage, by means of a first rectifier bridge connected to a three-phase mains supply, to form an actual value voltage and comparing the actual value voltage and a reference voltage. The braking resistor conducts when the comparison indicates that the actual value voltage is greater than the reference voltage. The reference voltage is formed from a rectified voltage obtained from the three-phase mains supply and rectified by a second rectifier bridge.

When the reference voltage is thus produced by a separate rectifier bridge, one obtains a reference voltage which is independent of the d.c. voltage of the frequency converter and which follows the a.c. voltage supplying the frequency converter. Such an arrangement is also safe in situations in which excess voltage occurs in the a.c. supply mains. Moreover, the power supply to the referent voltage circuit can be provided in a simple manner from the three-phase mains supplying the frequency converter.

The rectified voltage is obtained as a positive rectified voltage and a negative rectified voltage from the second rectifier bridge and voltages proportional to the positive rectified voltage and the negative rectified voltage are combined to form the reference voltage. A boost voltage is included in the reference voltage to increase the reference voltage and thereby shorten the duration of the conduction by the braking resistor.

The present method also includes obtaining a positive rectified voltage and a negative rectified voltage from the three-phase mains supply by the first rectifier bridge and combining voltages proportional to the positive rectified voltage and the negative rectified voltage to form the actual value voltage.

The present invention further provides a frequency converter having means for controlling a braking resistor in a d.c. circuit of the frequency converter, the means comprising: switch means in series with the braking resistor for controlling current flow through the braking resistor; first rectifier means for a three-phase mains supply voltage; means for forming an actual value voltage from an output of the rectifying means; and means for comparing the actual value voltage with a reference voltage, in which second rectifier means are provided for rectifying the three-phase mains supply voltage and means responsive to a rectified output of the second rectifier means are provided for forming the reference voltage.

Preferably, the second rectifier means comprises means for deriving the output thereof as a positive voltage and a negative voltage, the reference voltage forming means comprises means for summing voltages proportional to the positive voltage and the negative voltage and amplifier means are provided for matching the positive voltage to the summing means. Means may also be provided for including a variable boost voltage in the reference voltage.

The first rectifier means may comprise means for deriving a positive voltage and a negative voltage from the three-phase mains supply voltage, the actual value voltage forming means comprising means for summing voltages proportional to the positive voltage and the negative voltage; and amplifier means being provided for matching the positive voltage to the summing means.

The second rectifier means preferably comprises diodes and the switch means comprise a transistor.

BRIEF DESCRIPTION OF THE DRAWINGS

Further objects, features and advantages of the present invention will be more readily apparent from the following description thereof taken with reference to the accompanying drawings, wherein.

DESCRIPTION OF THE PREFERRED EMBODIMENT

Figure 1:
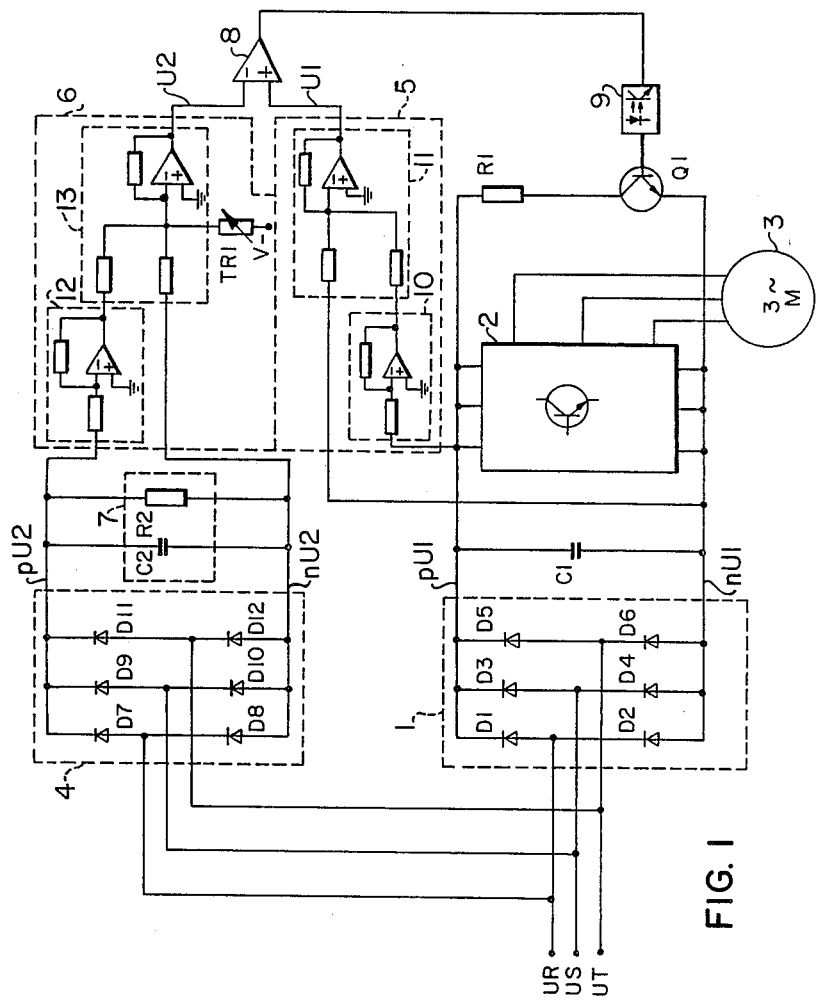
FIG. 1 shows an a.c. motor provided with a frequency converter.

The control of the braking resistor of the frequency converter is now described with reference to FIG. 1, in which the frequency converter supplies an a.c. motor 3. The frequency converter comprises a rectifier bridge 1 formed by diodes D1–D6, a capacitor C1 in the d.c. circuit of the frequency converter, used for filtering the d.c. voltage, an a.c. converter 2 for forming the three-phase voltage to be supplied to the motor 3, a brake resistor R1 in the d.c. circuit of the frequency converter and a transistor Q1, operating as a switch, for controlling current flow through the resistor R1. In the frequency converter 2, transistors for instance, may be used as semiconductor switches.

Figure 2A:
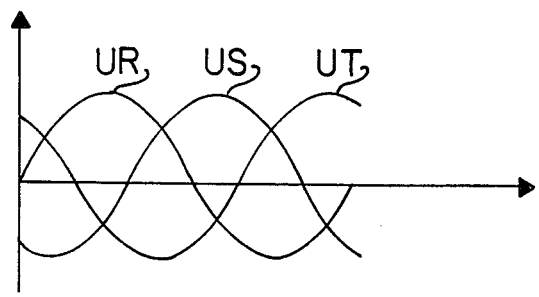
FIG. 2a illustrates the phase voltages of a three-phase mains supply.
Figure 2B:
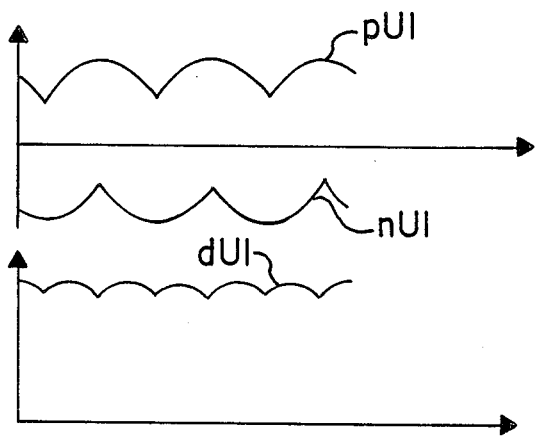
FIG. 2b illustrates the positive and negative voltages formed from the phase voltages of the three-phase mains supply.

The voltage of the three-phase mains supply, of which the phase voltages UR, US and UT are represented in FIG. 2a, is rectified by the rectifier bridge 1 to provide the d.c. voltage dU1 presented in FIG. 2b. The d.c. voltage dU1 is produced as the difference between the positive voltage pU1 and the negative voltage nU1 shown in FIG. 2b. The d.c. voltage dU1 contains an a.c. component oscillating with a frequency which is six times the mains frequency.

The purpose of the braking resistor R1 is to convert into heat the energy which the d.c. circuit outputs through the a.c. converter while the motor 3 is braking. The braking resistor R1 is controlled by the transistor Q1 in such a manner that the braking resistor R1 is conducting when the actual value voltage U1 formed from the voltage rectified by the rectifier bridge 1 from the three-phase mains voltage supply is greater than a reference voltage U2.

When the motor 3 is braking, the voltage in the d.c. circuit of the frequency converter increases, as power flows from the motor 3 to the d.c. circuit. In this situation the a.c. converter 2 operates as a rectifier.

An actual value voltage U1 is formed in an actual value voltage forming circuit 5. As taught by the invention, a referance voltage U2 is formed in a reference voltage forming circuit 6 from a voltage rectified by a second rectifier bridge 4, consisting of diodes D7–D12, from the three-phase mains supply and which consists of the difference between a positive voltage pU2 and a negative voltage nU2. A filtering circuit 7, shown in FIG. 1 and comprising a capacitor C2 and a resistor R2, is provided for filtering the voltage thus formed. It will therefore be apparent that the voltage formed from the difference between the positive voltage pU2 and the negative voltage nU2 is not as rippling as the voltage dU1.

The reference voltage forming circuit 6 comprises an amplifier 12 by which the positive voltage pU2 is converted into a negative voltage and the level of the voltage pU2 is reduced so as to be suitable for operational amplifiers employed in the amplifiers, summing members and comparators. In the summing member 13, voltages proportional to the positive voltage pU2 and the negative voltage nu2 formed by the second rectifier bridge 4 are combined. The level of the negative voltage nU2 may be reduced by means of the input resistance of the summing member 13.

The actual value voltage forming circuit 5 comprises an amplifier 10 by which the level of the positive voltage pU1 is reduced and this voltage is converted so as to be negative. In summing member 11, voltages proportional to the positive voltage pU1 and the negative voltage nU1 formed by the rectifier bridge 1 are combined. The level of the negative voltage nU1 may be reduced by means of the input resistance of the summing member 11.

Comparison of the actual value voltage U1 and the reference voltage U2 takes place in the comparator 8. From the output of the comparator 8 is obtained a control signal for a control means 9 of the transistor Q1. The transistor Q1 is controlled by the control means 9 in such manner that the braking resistor R1 located in the same branch of the d.c. circuit with the transistor Q1 is conductive when the actual value voltage U1 is higher than the reference voltage U2. To the summing member 13 is further conducted, through a trimmer TR1, a voltage V-, by which an adjustable boost is added to the reference voltage U2. This boost serves to increase the reference voltage U2 in order that the conduction time of the braking resistor R1 can be shortened. By shortening the conduction time of the braking resistor R1, it is possible to select a resistor R1 of lower power. The control means 9 may be implemented e.g. as a double emitter-follower circuit, and the input of the control means 9 may be provided with an optoisolator for achieving galvanic isolation.

It will be apparent to those skilled in the art that different embodiments of the invention are not exclusively confined to the example presented in the foregoing and that, instead, they may vary within the scope of the following claims.

We claim:

1. In a method of controlling the braking resistor of a frequency converter, said braking resistor being provided in a d.c. circuit of said frequency converter and being controlled by a switch connected in series with the braking resistor, said method comprising the steps of:

rectifying a mains voltage, by means of a first rectifier bridge (1) connected to a three-phase mains supply, to form an actual value voltage (U1);

comparing said actual value voltage (U1) and a reference voltage (U2); and causing said braking resistor (R1) to conduct when said comparison indicates that said actual value voltage (U1) is greater than said reference voltage (U2);

the improvement comprising the step of:

forming said reference voltage (U2) from a rectified voltage obtained from the three-phase mains supply and rectified by a second rectifier bridge (4).

2. A method according to claim 1, which includes obtaining said rectified voltage as a positive rectified voltage (pU2) and a negative rectified voltage (nU2) from said second rectifier bridge (4); combining voltages proportional to said positive rectified voltage (pU2) and said negative rectified voltage (nU2) to form said reference voltage (U2) and including in said reference voltage a boost voltage to increase the reference voltage (U2) and thereby shorten the duration of the conduction by said braking resistor (R1).

3. A method according to claim 1, which includes obtaining a positive rectified voltage (pU1) and a negative rectified voltage (nU1) from said three-phase mains supply by said first rectifier bridge (1) and combining voltages proportional to said positive rectified voltage (pU1) and said negative rectified voltage (nU1) to form said actual value voltage (U1).

4. A method according to claim 2, which includes obtaining an additional positive rectified voltage (pU1) and an additional negative rectified voltage (nU1) from said three-phase means supply by said first rectifier bridge (1) and combining voltages proportional to said additional positive rectified voltage (pU1) and said additional negative rectified voltage (nU2) to form said actual value voltage (U1).

5. A method as claimed in claim 1, which includes employing a plurality of diodes (D7–D12) in said second rectifier bridge (4).

6. A method as claimed in claim 1, which includes employing transistor means (Q1) as said switch.

7. In a frequency converter having means for controlling a braking resistor in a d.c. circuit of said frequency converter, said means comprising:
 switch means in series with said braking resistor for controlling current flow through said braking resistor;
 first rectifier means (1) for a three-phase mains supply voltage;
 means (5) for forming an actual value voltage (U1) from an output of said rectifying means (1); and
 means (8) for comparing said actual value voltage (U1) with a reference voltage (U2);
the improvement comprising:
 second rectifier means (4) for rectifying said three-phase mains supply voltage and means (6) responsive to a rectified output of said second rectifier means (4) for forming said reference voltage (U2).

8. A frequency converter according to claim 7, wherein said second rectifier means (4) comprises means for deriving said output thereof as a positive voltage (pU2) and a negative voltage (nU2); said reference voltage forming means (6) comprises means (13) for summing voltages proportional to said positive voltage (pU2) and said negative voltage (nU2); amplifier means (12) are provided for matching said positive voltage (pU2) to said summing means (13); and means (TR1) are provided for including a variable boost voltage in said reference voltage (U2).

9. A frequency converter according to claim 7, wherein said first rectifier means (1) comprise means for deriving a positive voltage (pU1) and a negative voltage (nU2) from said three-phase mains supply voltage; and said actual value voltage forming means (5) comprise means (13) for summing voltages proportional to said positive voltage (pU2) and said negative voltage (nU2); amplifier means being provided for matching said positive voltage (pU1) to said summing means (13).

10. A frequency converter according to claim 7, wherein said second rectifier means (4) comprise diodes (D7–D12).

11. A frequency converter according to claim 7, wherein said switch means comprise a transistor (Q1).

* * * * *